United States Patent
Fonte et al.

(10) Patent No.: US 10,341,648 B1
(45) Date of Patent: Jul. 2, 2019

(54) AUTOMATED DETECTION OF PROBLEM INDICATORS IN VIDEO OF DISPLAY OUTPUT

(71) Applicant: Amazon Technologies, Inc., Seattle, WA (US)

(72) Inventors: Spencer Patrick Fonte, Seattle, WA (US); Sean James Amos, Seattle, WA (US); Michael Aaron Fox, Riviera Beach, FL (US)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 15/710,269

(22) Filed: Sep. 20, 2017

(51) Int. Cl.
| | |
|---|---|
| G06K 9/00 | (2006.01) |
| H04N 17/00 | (2006.01) |
| G06T 7/00 | (2017.01) |
| G06T 13/80 | (2011.01) |
| G06T 7/20 | (2017.01) |

(52) U.S. Cl.
CPC ......... *H04N 17/004* (2013.01); *G06T 7/0002* (2013.01); *G06T 7/20* (2013.01); *G06T 13/80* (2013.01); *G06T 2207/10016* (2013.01)

(58) Field of Classification Search
CPC ....... H04N 17/004; G06T 7/20; G06T 7/0002; G06T 13/80; G06T 2207/10016
See application file for complete search history.

(56) References Cited

U.S. PATENT DOCUMENTS

| | | | | |
|---|---|---|---|---|
| 2009/0006999 A1* | 1/2009 | Roberts | ............... | G11B 27/034 715/772 |
| 2013/0249796 A1* | 9/2013 | Sugishita | ............. | G06F 3/0346 345/158 |
| 2014/0354826 A1* | 12/2014 | Kolarov | ............... | H04N 17/002 348/175 |
| 2015/0193001 A1* | 7/2015 | Kurokawa | ............... | G06T 7/20 345/156 |
| 2015/0265920 A1* | 9/2015 | Kim | ....................... | A63F 13/49 463/31 |
| 2016/0019406 A1* | 1/2016 | Hejl | ....................... | G06K 7/146 235/462.15 |
| 2018/0217680 A1* | 8/2018 | Sudou | ...................... | G06F 3/01 |

\* cited by examiner

*Primary Examiner* — Aaron W Carter
(74) *Attorney, Agent, or Firm* — Knobbe, Martens, Olson & Bear, LLP

(57) ABSTRACT

Systems, methods, and computer-readable media are described for performing automated analysis of frame-over-frame pixel changes in recorded video of the display output of a computing device to determine whether the computing device presented an animated buffering indicator or other animated problem indicator. A system may be configured to detect motion by determining frame-over-frame pixel intensity changes at various pixel locations across a number of frames, then to determine whether the pixel locations that suggest motion (such as those pixel locations that had sufficient intensity change when accounting for potential noise in the video data) are concentrated in an area of the screen in which problem indicators are expected to be displayed. The system may then determine whether the shape of the pixel locations that indicated sufficient motion match an expected shape or path of motion for a given class of problem indictors.

20 Claims, 5 Drawing Sheets

AUTOMATED DETECTION OF PROBLEM INDICATORS IN VIDEO OF DISPLAY OUTPUT

BACKGROUND

Benchmarking and performance testing of computer software and hardware is commonly performed for a variety of reasons. For example, a developer of software, a hardware manufacturer, a network service provider, or other party may desire to compare the performance of different combinations of software and hardware under various conditions, such as with different hardware configurations, under different operating loads, with different network conditions, etc. When the party testing software is the software's developer, the software's code may be configured to output or store error codes or other specific data when specific problems are encountered during runtime. However, identifying specific problems that occur or that affect usability of a given system or specific software may be more difficult when such a problem must be assessed by a third party, particularly when the software or service being tested or otherwise subject to an experiment conveys problems in a visual manner that is designed to convey the problem to a human viewing a computer monitor or other display rather than in the form of an automated data output log or similar output. For example, in instances where a robot or other machine is configured to perform a series of automated actions on a keyboard, mouse, and/or touchscreen in order to perform experiments or tests of a computing system under various conditions, operating problems that are visually displayed on a screen by the computing system being tested may be difficult to identify in an automated manner (e.g., without manual human intervention that undercuts the efficiency of using a robot to conduct such an experiment).

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Figure 1A:
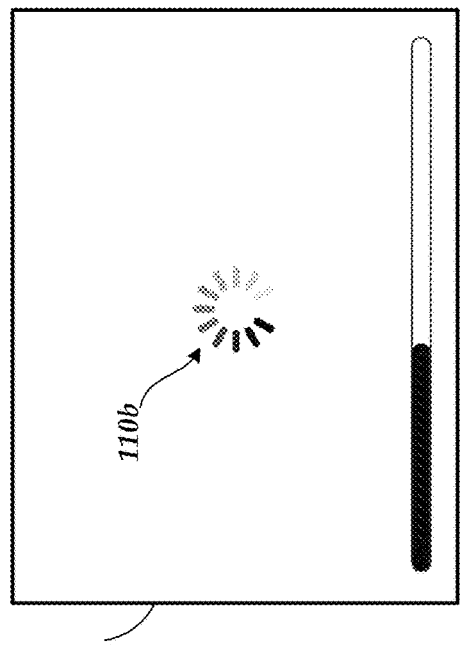
FIGS. 1A-1D illustrate sample video frames that include problem indicators that may be automatically identified according to aspects of the present disclosure based on detected frame-over-frame motion.

Generally described, aspects of the present disclosure relate to automated analysis of video data, such as video depicting the display screen or video output of a computing system, to identify whether a buffering indicator or other problem indicator is visually presented within the video data. As one example, various services that stream content to a client computing device over a network for playback on the client computing device may at times display a visual indicator indicating that content playback has been temporarily interrupted or paused. A common reason for the display of such visual indicators is that an insufficient amount of the streaming content has been buffered on the client computing device, such as due to network connectivity problems, overly high server load, insufficient memory or processor resources on the client computing device, and/or other problems.

Different buffering indicators or similar problem indicators may be presented depending on the particular service providing streaming content in a given instance. One common characteristic of such indicators is typically that they are animated in some respect, where "animated" refers to the appearance, orientation, or position of the indicator changing between at least some successive frames of the period during which the indicator is visually presented. One reason that the operators or developers associated with many different services choose to design such indicators within their services to be animated in some respect is that a static indicator (e.g., a single visual element that is not animated in any way during display) provides an ambiguous indication to the user as to whether the underlying problem is either a temporary one related to content loading or a more critical system error that has caused other system operations to halt or freeze. It is desirable for problem indicators to convey to a user whether the user should simply wait for content to sufficiently load, or whether an application or system has "frozen," which may require user intervention. Many services choose to convey the occurrence of a temporary loading or buffering problem with a looped animation, such as one or more graphical elements that move in a circular pattern, as will be described in more detail below with reference to FIG. 1.

While the term "problem indicator" is often used herein to broadly refer to various types of the above-described visual indicators (and others) that may be presented by an application, service or operating system, not all such indicators necessarily must represent that a problem has occurred in the operation of the associated application, service, device or operating system to be considered a problem indicator as the term is used herein. For example, while buffering indicators and loading indicators are both considered types of problem indicators according to the present disclosure, some applications may present a loading screen with an accompanying animated loading indicator at least temporarily each time a certain feature of the application is accessed (e.g., if a large amount of data must be loaded that requires at least a minor pause in content presentation or user interactivity even under optimal hardware and network conditions). Accordingly, in some embodiments, such a loading indicator would still be considered a problem indicator as the term is used herein, although appearance of the indicator may not necessarily represent a problem in the application's operation unless the indicator is presented for a relatively long period of time compared to an expected or average loading time for the application (e.g., is displayed on screen beyond a threshold time length).

As will be described in more detail herein, aspects of the present disclosure include automated analysis of frame-over-frame pixel changes in recorded video of the display output of a computing device to determine whether the computing device presented an animated buffering indicator or other animated problem indicator during a given portion of the video. As used herein, references to a video are generally intended to be to digital video data, such that any analog video recording would first be converted to digital video. In some embodiments, a variety of problem indicators having different and potentially unknown specific appearances may be automatically identified based at least in part on an expected motion-related attribute of a given class of indicators. For example, one class of indicators may be those that animate in a circular pattern (e.g., that include one or more graphical elements that follow a circular path across a number of frames), while another class of indicators may follow a linear path (e.g., an animation of a horizontal bar gradually filling, or a graphical element presented as "bouncing" horizontally or otherwise moving repeatedly from side to side in a certain portion of the display screen).

When attempting to identify circular-moving buffering indicators according to one embodiment, a system may be configured to detect motion by determining frame-over-frame pixel intensity changes at various pixel locations across a number of frames. The system may then determine whether the pixel locations that suggest motion (such as those pixel locations that had sufficient intensity change when accounting for potential noise in the video data) are concentrated in an area of the screen (such as the center portion of the screen, in one instance) in which any problem indicators are expected to be displayed by a given content streaming service and/or in the given embodiment. The system may then determine whether the shape of the pixel locations that indicated sufficient motion over a given set of frames match an expected shape or path of motion for a problem indictor (such as a circle, in one embodiment). If there is a shape match at this stage, the system may take an appropriate action, such as tagging in experiment data that a buffering indicator or other problem was encountered at a given point in the video (such as to later generate data regarding the relative percentages or number of buffering indicators displayed under various testing conditions), stopping an experiment being performed, or indicating to a human operator that a problem has occurred with respect to the computing device having its video output recorded and analyzed by the system.

Aspects of the present disclosure have particular utility in an operating environment in which recorded video of a computing system or other similar system's video output is analyzed to determine performance characteristics of the computing system. For example, as will be described below, one operating environment may include an experiment platform that includes a robotic arm that is configured to perform camera-assisted actions on a touch-sensitive display screen, such as the screen that displays the output of a mobile computing device, desktop computer, set-top box, or other computing system. The robotic arm may be programmed to move to a specific predefined position and touch the display screen of the mobile device at the predefined position to launch a mobile application installed on the mobile device, and perform a series of tasks such as search for a video, play a video, upload a file, etc.

In some embodiments, methods described herein may be implemented in association with experiments designed to test the hardware and/or software performance of a computing device. The term "experiment" as used herein is intended to broadly refer to any of a variety of different tests or series of tests, and may include tests such as hardware or software performance testing, usability testing, speed of computing performance, network testing, quality assurance (such as checking for crashes, bugs or other errors), and/or many others depending on the embodiment. For example, an experiment may test whether (and/or the extent to which) video buffering or other content buffering occurs across one or more different streaming content services, across different client devices, and/or under different network conditions. In some embodiments, a party controlling an experiment may manipulate local delivery of data over a data network in order to simulate conditions of a certain network or network conditions in a certain geographic region (e.g., a developing country or remote area with inconsistent or unreliable network conditions). In other embodiments, experiments may test or measure the length or extent of problems signified by particular problem indicators that may represent data loading conditions other than network-related buffering, such as device-specific loading times that are driven at least in part by the device's hardware and software configurations.

FIGS. 1A-1D illustrate sample video frames 101-104 that include problem indicators that may be automatically identified according to aspects of the present disclosure based on detected frame-over-frame motion. Video frames 101 and 102 depicted in FIGS. 1A and 1B, respectively, may be still images from recorded video capturing the display output from a computing system that is executing a movie playback application or streaming a movie from a network-based service. Frame 102 may appear a short time after frame 101 in the recorded video data, such as 0.5 seconds as an example. In at least the time period spanning frames 101 and 102 in the video depicted in FIGS. 1A and 1B, the computing device that had its display output recorded in the video may have been in a buffering state, whereby content playback was automatically paused by an application or service via which the computing device was accessing the content (such as a movie being streamed over a network). The problem indicator displayed by the particular application or service is captured in the video in two different display states as buffering indicator 110a and 110b. As will be appreciated, the buffering indicator may have been smoothly animated as a "spinning" icon, with two individual steps of the animation depicted by indicators 110a and 100b. According to the particular application or service illustrated in the example of FIGS. 1A and 1B, there is no streaming content shown (e.g., the majority of the screen is white or blank rather than showing a movie or other content) during buffering, with simply a static playback progress bar and the animated problem indicator 110a and 110b displayed during buffering periods.

Figure 1B:
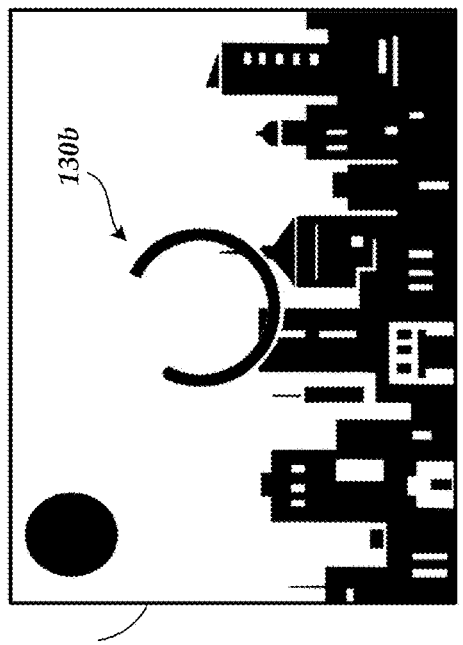
Figure 1C:
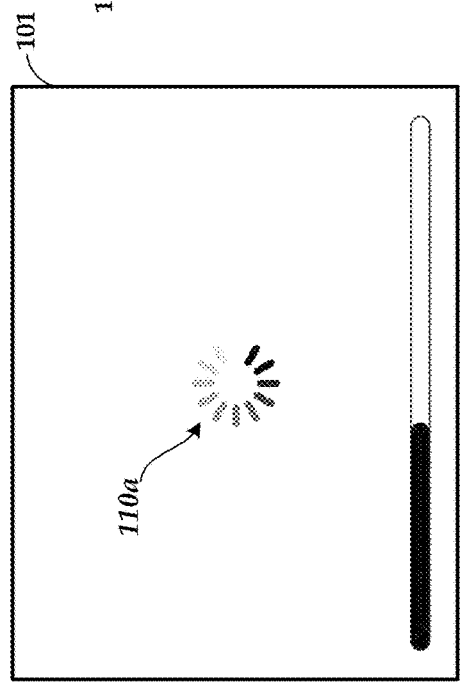
Figure 1D:
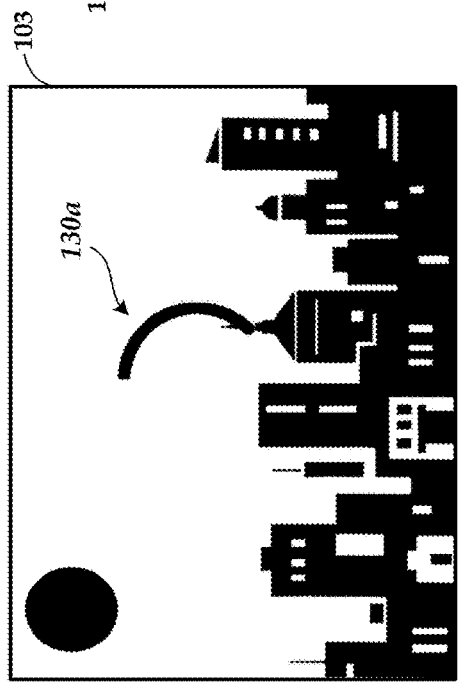

Video frames 121 and 122 depicted in FIGS. 1C and 1D, respectively, may be still images from a second recorded video capturing the display output from a computing system that is executing a different movie playback application or accessing a different streaming content service than illustrated in FIGS. 1A and 1B. Similar to the frames discussed above, frame 122 may appear a short time after frame 121 in the second recorded video data. In further similarity to FIGS. 1A and 1B, the computing device that had its display output recorded in the second video may have been in a buffering state with automatically paused content playback in the time period that included frames 121 and 122. However, the particular content playback service or application operating on the computing device that had its display output captured in frames 121 and 122 has displayed a different problem indicator 130a than problem indicator 110a discussed above, and has kept a paused frame of the movie being played (depicted as a city skyline in FIGS. 1C and 1D, which doesn't change between frames 121 and 122) visible beneath the problem indicator 130a and 130b. The problem indicator shown in the two positions 130a and 130b may be an indicator that has an arc of changing length that repeatedly animates in a circular path of motion as its size changes. As will be appreciated, there may be a large number of other appearances of problem indicators besides those illustrated in FIGS. 1A-1D, and aspects of the present disclosure may enable a computing system to automatically identify these and other problem indicators in video data even if the system has not been specifically trained to identify a particular image object or other known indicator appearance.

Figure 2:
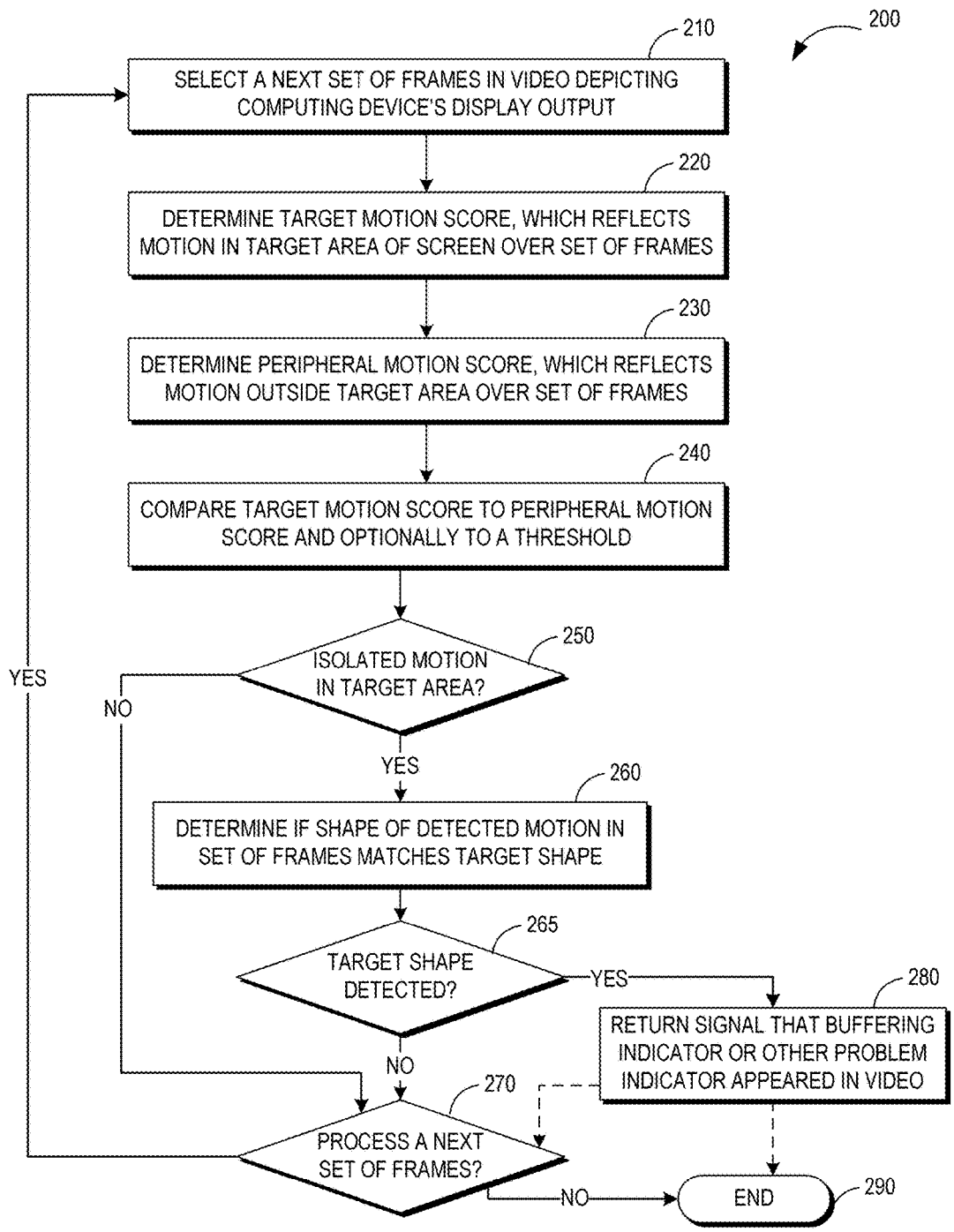
FIG. 2 is a flow diagram depicting an illustrative method for identifying whether an animated problem indicator was presented within screen-captured video in accordance with aspects of the present disclosure.

FIG. 2 is a flow diagram depicting an illustrative method 200 for identifying whether an animated problem indicator was presented within screen-captured video in accordance with aspects of the present disclosure. The example routine 200 may be carried out, for example, by the computing device experiment system 500 of FIG. 5 (or one or more components thereof), which will be described below. For convenience, the steps of the example routine 200 are described as being performed by a system.

The illustrative method 200 begins at block 210, where the system selects a next set of frames to be analyzed in a video. In one embodiment, the video may be a video recorded by a camera configured to record the visual display output of a computer display monitor or a touchscreen computing device, as will be described further below with reference to FIG. 4. In another embodiment, the video may have been captured by a capture card or another recording device other than a camera, as will be further described below. In embodiments in which frames are analyzed in sets or batches of n number of frames at a time (where n may be, for example, 20 frames), the initial set of frames selected at block 210 may be the first n frames of the video data. In other embodiments, analysis may begin with a set of frames other than those at the beginning of the given video file or video stream. For example, in an embodiment in which video is analyzed in real time as the video is captured or received, the set of frames selected at block 210 may be the most recent n frames captured or received in streaming video data.

At block 220, the system may determine a motion score that represents an extent to which motion occurs a given target area over the set of frames. The target area may be a specific portion of the captured screen in which a given indicator would be expected to appear if the indicator were to appear at all. In one example when analyzing video associated with a service in which a spinning animation may be presented near the center of the screen during content buffering, the target area may be set as a center portion of the screen (for example, a rectangle having specific dimensions, such as 300 pixels by 300 pixels centered around the center point of the video frame). In some embodiments, the system may access previously stored bounding box or bounding region information that identifies one or more areas of the screen that should be treated as the target area in a given instance. There may be different target area identification information stored for different services or applications, such that the specific service or application that a tested computing device was accessing or executing when its screen output was recorded may dictate the area(s) of the recorded video frame data that the system should consider as a target area. Similarly, the target area definitions may be different based on the specific computing device having its display captured and/or for the specific screen aspect ratio that was recorded.

The stored target areas generally and/or for a specific service, application, device and/or display screen may have been determined by a human operator, by machine learning methods, and/or a combination of manual and automated techniques (for example, by training a machine learning model using screen captured video data that includes time markers marking instances in which a problem indicator of interest was presented on the captured display screen). Depending on the embodiment, the stored target area information may identify the target area by absolute pixel values within the captured frame (e.g., as a bounding box or other bounding region data defined by specific pixel coordinate values relative to the captured video data) or by relative percentages or mathematical relationships that can be used by the system to determine the bounding region for a given frame size (e.g., a target area may identify a frame center point by dividing the frame width and height in half, then may define the target area as a bounding box centered at that point and having a width and height that is a preset percentage of the frame width and height).

The motion score determined at block 220 may be determined in a manner discussed in more detail below with reference to FIG. 3. The motion score determined at block 220 may sometimes be referred to herein as a target motion score to distinguish it from another motion score that may be determined with reference to one or more other areas of the screen in block 230 (referred to as a peripheral motion score, as described below). The target motion score may generally indicate the extent of motion in the target area over the set of frames. In some embodiments, the target motion score for an area may represent the greatest intensity change that occurred for any pixel (after correcting for potential noise or other video capture inconsistencies) or group of pixels in the target area over a pair of frames or the entire set of frames. In other embodiments, the target motion score may be determined as a binary value (either indicating that there was movement in the area or there wasn't movement in the area over the set of frames).

As will be described in more detail below with respect to FIG. 3, the system may be configured to determine the target motion score based on intensity changes from frame to frame in different portions of the area (or individual pixel locations in the area). The intensity of a pixel in an individual frame may refer to, in some embodiments, its gray scale value (such as on a scale from 0-255, with zero representing pure black and 255 representing pure white). The intensity change value of a given location between two frames may be determined, in some embodiments, as the difference between the given location's intensity value in the first frame and the same location's intensity value in the second frame (which each may have been adjusted to reduce noise, as will be described below). In some embodiments, the system may use intensity value changes in frame portions or individual pixels as a proxy for on-screen movement rather than actually tracking movement of any specific displayed object or indicia in the captured scene.

Once the target motion score has been determined, the illustrative method proceeds to determine a peripheral motion score at block 230. The peripheral motion score may be determined in a similar manner as the determination of the target motion score (for example, they each may be determined in a manner similar to the method discussed below with respect to FIG. 3), but may be based on an analysis of pixels outside of the target area. For example, the peripheral motion score may represent the extent of motion identified to have occurred within any portion of the screen outside of the target portion. As an example, in an embodiment in which a center portion of the screen is the target portion, a high peripheral score may indicate that there was motion detected by the system in one or more of the top, left, right, and/or bottom portions of the screen.

At block 240, the system may compare the target motion score to the peripheral motion score and optionally to a threshold score. A goal of the comparison(s) at block 240 may be to determine whether there was significantly more motion or pixel intensity change in the target area than outside of the target area during the given set of frames. For example, often when a buffering indicator is presented on screen, the buffering indicator is the only or nearly the only thing on screen that animates or moves during the buffering period (e.g., a video or other content item that was being visually presented prior to the occurrence of a buffering problem may appear paused or frozen while an animated buffering indicator is presented). Thus, a target motion score that indicates the occurrence of motion within the target area combined with a peripheral motion score that indicates absence of motion outside of the target area may strongly correlate with the appearance of a buffering indicator during the set of analyzed frames. The threshold considered at block 240 may, depending on the embodiment, represent a minimum score difference between the target motion score and peripheral motion score to be considered as a substantial difference, or may represent a minimum target motion score to be considered substantial motion as opposed to noise or other video capture inconsistencies.

At decisional block 250, the system determines whether the motion score comparison at block 250 suggests that there was isolated motion in the target area. For example, the system may determine whether there was motion detected in the target area while the rest of the screen remained static, or may determine whether there was significantly more motion within the target area than outside of the target area. If no such isolated motion was detected for the analyzed set of frames, the method proceeds to block 270 to consider whether to repeat the above-discussed blocks of FIG. 2 with respect to a next set of frames in the video data. Conversely, if sufficient motion within the target area was detected relative to outside of the target area, the method proceeds to block 260, where the system determines if a shape of the detected motion in the target area within the set of frames matches a target shape.

In order to determine whether a shape of the detected motion in the target area within the set of frames matches a target shape, the system may utilize a different technique depending on the shape of interest and the embodiment. For example, in one embodiment, the system may be configured to detect problem indicators that move in a circular pattern, in which case a circular shape detector may be employed at block 260. As an example, the system may use the known circle Hough Transform ("CHT") method or similar feature extraction technique to detect whether the pixel locations that had intensity changes at any point within the analyzed set of frames form a circular pattern. As will be discussed below with reference to FIG. 3, the data analyzed for shape detection may be, in some embodiments, a matrix of pixel intensity change values, where each value in the matrix represents the highest frame-over-frame threshold change that occurred at a respectively located pixel location between any two successive frames in the analyzed frame set (after first applying image noise reduction techniques at the individual frame level, as will be discussed below). In some embodiments, the system may additionally check that there is less than a threshold amount of additional noise (e.g., additional non-zero final pixel intensity change values in the matrix) that falls outside of the shape of interest (e.g., outside of the circle detected by a circle Hough Transform).

In other embodiments, the system may use a different shape detector (other than a circle detection technique like CHT) depending on the expected shape of motion for a particular class of problem indicator or a specific service or application being accessed or executed by the computing device for which the screen output was analyzed. For example, the system may approximate contour information in the pixel intensity change value matrix and then determine whether one of various shapes are present based on the number of identified vertices (e.g., a triangle will have three vertices, while a square or rectangle will have four vertices), the aspect ratio of identified bounding boxes (e.g., a square's aspect ratio will be approximately 1:1), and/or other identified shape-related data. In other embodiments, the system may utilize a neural network for detection of specific shapes of motion that coincide with the presence of given problem indicators of interest in training data.

If the target shape was not detected at block 265, the method proceeds to block 270, discussed below. If instead the target shape was detected in the target area at block 265, the method proceeds to block 280, where the system may return a signal that the buffering indicator or other problem indicator appeared in the video at some point in the set of analyzed frames. In response to this signal, the system or another system with which it is in communication may perform a responsive action (not illustrated in FIG. 2). For example, the responsive action may include tagging in experiment data that a buffering indicator or other problem was encountered at a given point in the video, stopping an experiment being performed, or indicating to a human operator that a buffering problem or other problem has occurred with respect to the computing device having its video output recorded. In some embodiments, such as those in which the system ends 340 its experiments once it identifies that a buffering problem or other problem has occurred, the illustrative method then ends at block 290. In other embodiments, the method may proceed to block 270. For example, in some embodiments, the illustrative method may continue to process the remainder of the video's frames and keep track of the length of time that the problem indicator was presented in the video. As mentioned above, this may be beneficial to identify whether a loading or buffering indicator was presented for longer than an expected period of time (e.g., longer than a threshold time, where the threshold may be set based on either the average or minimum length of time that loading or buffering is expected to occur under certain network conditions or device configurations). In continuing to process the remaining frames of the video, the system may additionally or alternatively maintain a count of the number of times that a problem indicator was presented (e.g., grouping all consecutive frames in which the indicator was continuously presented as a single count), and may store information indicating the starting time and length of each appearance.

At block 270, the system determines whether to process a next set of frames before returning to block 210, or whether to instead end the illustrative method 200. In some embodiments, the system may advance to a next set of available video frames that partially overlap with the frames just analyzed. For example, if frames 1-20 were analyzed in the first pass of illustrative method 200, the next set of frames to be used for the second pass may be frames 2-21. In other embodiments, larger jumps in frames may occur between successive passes. As will be appreciated, the next set of frames selected at block 270 may include, in embodiments in which video frames are analyzed in real time as they are captured, one or more frames that had not yet been recorded by the camera or capture card when the illustrative method began its prior pass through block 210.

Figure 3:
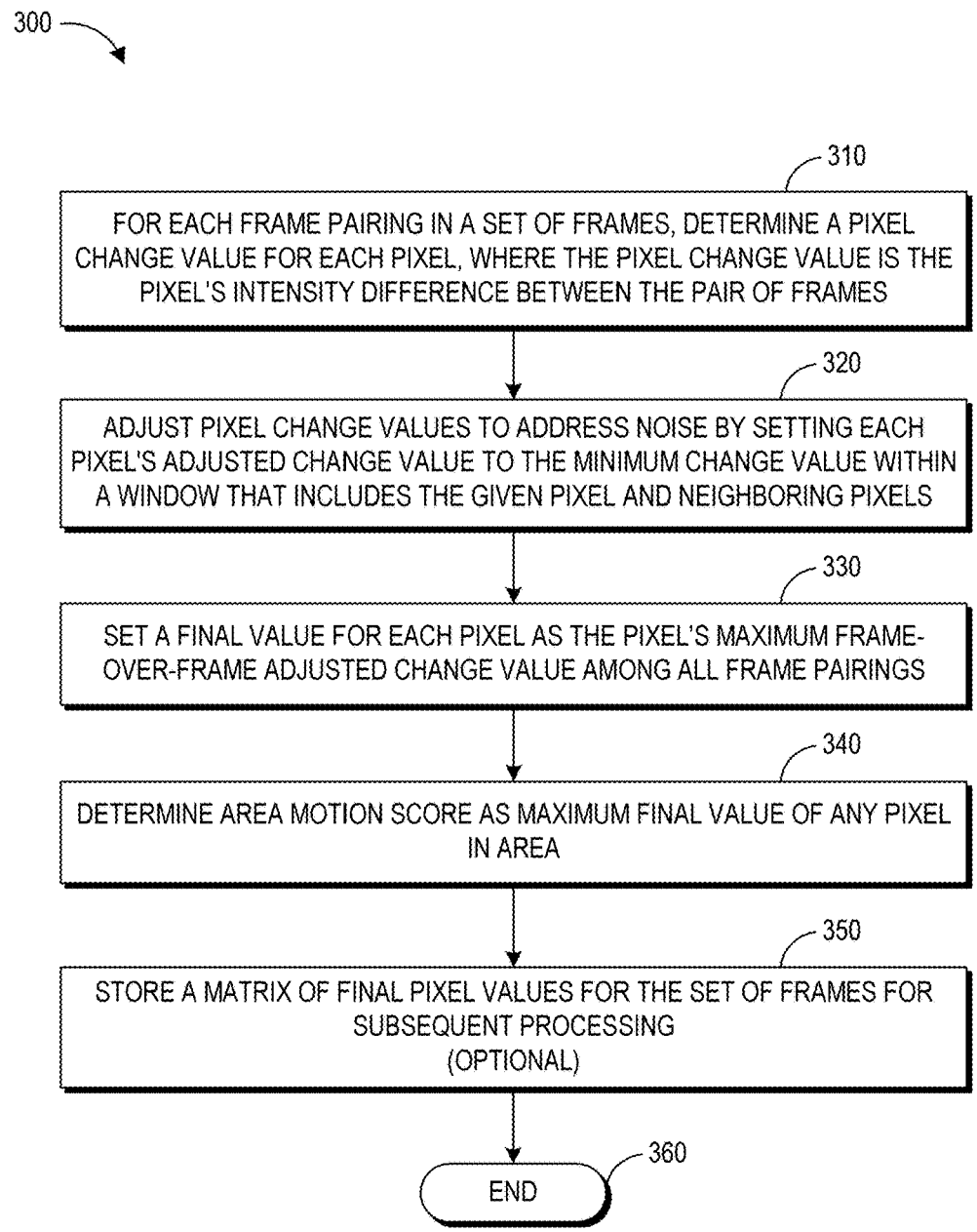
FIG. 3 is a flow diagram depicting an illustrative method for determining a motion score for a given frame area across a set of frames in accordance with aspects of the present disclosure.

FIG. 3 is a flow diagram depicting an illustrative method 300 for determining a motion score for a given frame area across a set of frames in accordance with aspects of the present disclosure. The example routine 300 may be carried out, for example, by the computing device experiment system 500 of FIG. 5 (or one or more components thereof), which will be described below. For convenience, the steps of the example routine 300 are described as being performed by a system. As discussed above, the illustrative method 300 may be performed both with respect to determining a motion score for a target frame area (which may be referred to as a target motion score) and for determining a motion score for frame portions outside of the target area (which may be referred to as a peripheral motion score). Thus, references to an area in the description of FIG. 3 may be to a target area or peripheral area depending on the specific score being determined in a given pass through the illustrative method 300 (e.g., whether the method is being implemented in a given instance in order to determine the target area score or the peripheral area score).

The illustrative method 300 begins at block 310. At block 310, the system may, for each of a plurality of frame pairings, determine a pixel change value for each pixel in the area, where the pixel change value is the frame-over-frame pixel intensity difference of the given pixel between the pair of frames. In some embodiments, the system may first convert the image data of each frame to be gray scale if originally captured in color. Thus, the intensity of a pixel in an individual frame may refer to, in some embodiments, its gray scale value (such as on a scale from 0-255, with zero representing pure black and 255 representing pure white). The intensity change value of a given location between two frames may be determined, in some embodiments, as the absolute value of the difference between the given pixel location's intensity value in the first frame and the same pixel location's intensity value in the second frame. At block 310, the system may determine this intensity change value for each of a number of different pairings of frames, such as pairing each frame at its subsequent frame until all pairings within the current frame have been analyzed (e.g., pairing frames 1 and 2, pairing frames 2 and 3, pairing frames 3 and 4, etc.). The results for a given frame pairing, in some embodiments, may be stored or otherwise represented as a matrix of values, where the matrix has the same dimensions as the pixel dimensions of the frame area being analyzed (e.g., if a 200×200 pixel area in the center of a frame is being analyzed, the matrix may be 200×200).

Next, at block 320, the system may apply noise reduction to the determined pixel change values by setting each pixel's adjusted change value to the minimum change value within a window that includes the given pixel and neighboring pixels. The reason for implementing block 320, in some embodiments, may be to address the possibility of noise in the video capture data whereby a specific pixel changes intensity value without any change in its neighbors, which may be the result of inaccurate video capture or a inaccurate pixel display intensity on a display monitor captured in the video as opposed to an actual signal from the display monitor's controlling computing device to display a different pixel intensity value. For example, a video created by filming a display screen that displays a single still image the entire length of the video may nonetheless include individual pixels that appear to change intensity from frame to frame due to camera and/or display screen limitations. Accordingly, the system may adjust each pixel's intensity change to be the minimum change value of that pixel and its neighboring pixels in order to ensure that a pixel's change value is not set to a large value as a result of, for example, a single pixel changing substantially without any change to its neighbors (which, depending on the resolution and number of frames over which the change occurred, would possibly not have even been detected by a human eye viewing the screen).

In some embodiments, the neighboring pixels for a given pixel may be considered to be limited to those pixels horizontally adjacent to the give pixel (so that each pixel window is 3 pixels in a row), or limited to those pixels vertically adjacent. In other embodiments, the neighboring pixels (and pixel windows as a result) may be defined differently, such as by considering neighboring pixels for a given pixel to be the pixel above, pixel below, pixel to the left and pixel to the right (if each such neighboring pixel exists for the given pixel location), may extend more than one pixel in one or more directions, or may include diagonally neighboring pixels. For example, in one embodiment, each window may be a 3×3 pixel window (thus including nine pixels). Because a window may be defined for each pixel location (e.g., a window may be defined for each pixel that has the given pixel at its center), the windows may be overlapping. Thus, the system may consider a specific pixel multiple times (e.g., when considering the adjustment to that specific pixel's value, as well as when considering the adjustments to its neighboring pixels' values).

At block 330, the system sets a final value for each pixel (or effectively for each pixel window, as described above) as the maximum frame-over-frame adjusted change value among all frame pairings in the set being analyzed. For example, if a given pixel location had a large intensity change between one pair of adjacent frames, after adjusting for noise as described above with the user of pixel windows, then the final pixel value for that pixel location may be set to that high intensity change value even if there were other frame pairings where the pixel location's intensity value did not change.

Next, at block 340, the system may then determine the area motion score (e.g., the target motion score or peripheral motion score as appropriate) as the maximum final value of any pixel in the area. Thus, in one embodiment, the motion score for an area may be relatively high if there was any frame pairing in which all of the pixels in a single window within the area changed substantially between the pair of frames. In other embodiments, the area motion score may be determined as a value other than the maximum final value of any pixel in the area, such as by setting the area motion score to a certain percentile of the final values of the pixels in the area, which may downplay the effect of (or effectively ignore) movement that only occurs in a very small subset of the area in determining the area motion score. For example, in an embodiment in which the area motion score is set to the $90^{th}$ percentile value, the system may sort all of the final values for pixels in the area in ascending order, then may select the value appearing in the 90th percentile position in the sorted list as the area motion score. In some embodiments, a similar percentile approach may also be used instead of a maximum at block 330 when setting the final value for each pixel. At block 350 (which may occur prior to block 340 in some embodiments), the system may optionally store a matrix of the final pixel values for the set of frames (e.g., those determined at block 330 above) for subsequent processing. For example, the matrix of final pixel values may be subsequently used in block 260 of illustrative method 200, discussed above, in order to determine the shape of detected motion within the target area.

While FIG. 3 has been described above with respect to determining a motion score for a particular portion or portions of the screen, it will be appreciated that during the implementation of method 200 described above with reference to FIG. 2, the system may perform blocks 310, 320 and 330 with respect to the entire frame (e.g., without limiting to the target area or peripheral area), then may determine the target motion score and peripheral motion score based on a matrix of final pixel values that includes all of the pixel locations in the given frame size. Thus, block 340 may be implemented twice (once for determining the target motion score based on the final pixel values within the target area, and once for determining the peripheral motion score based on the final pixel values outside of the target area) for each single pass through blocks 310, 320, 330 and optionally 350.

Figure 4:
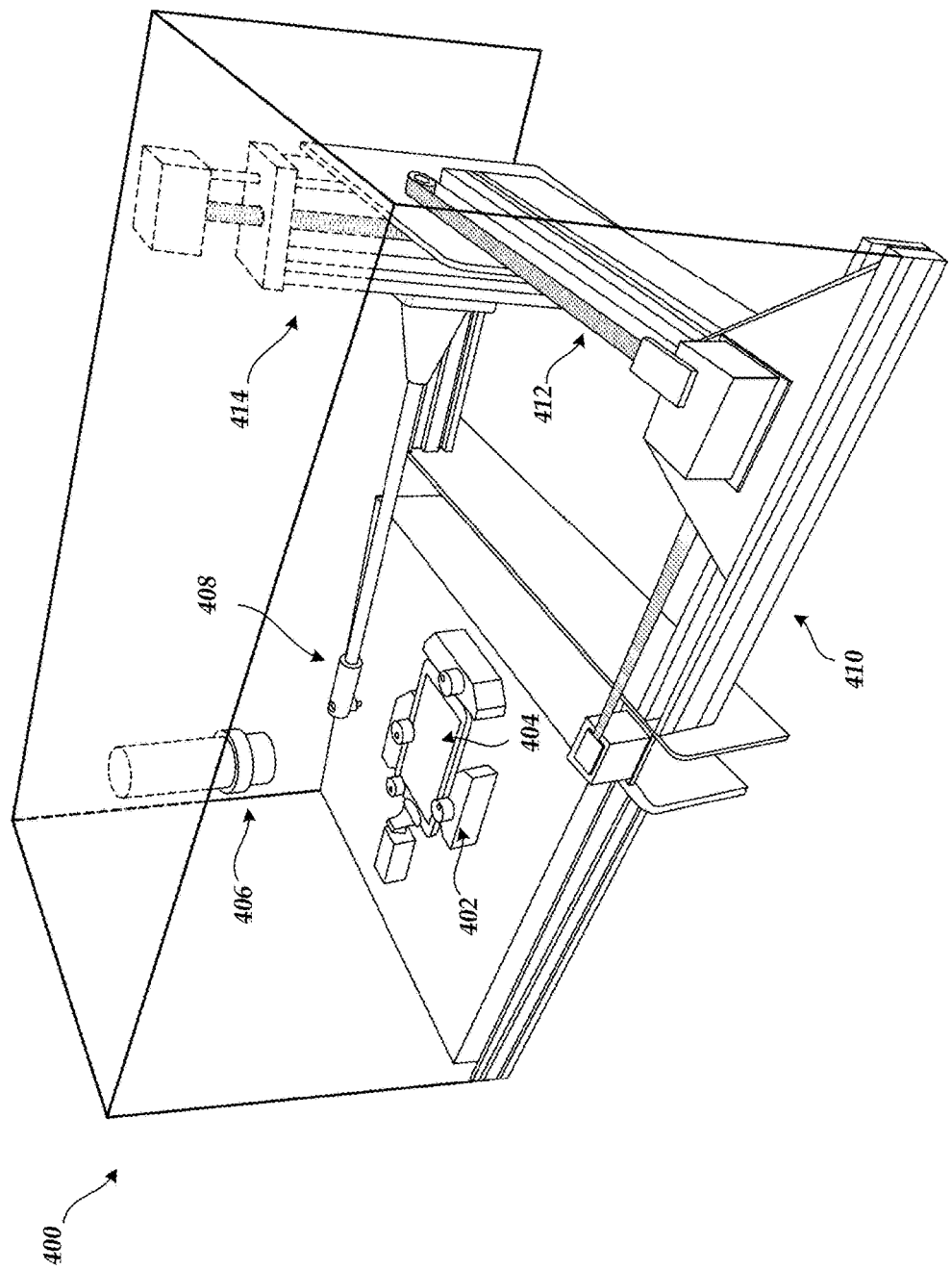
FIG. 4 is a perspective view of an operating environment that includes a camera-assisted robotic arm system that may be used in association with some embodiments of the present disclosure.

FIG. 4 depicts a perspective view of an illustrative operating environment that includes a camera-assisted robotic arm system (which include components similar to system 500 described below) that may be used in association with some embodiments of the present disclosure. As discussed above, a robotic arm and/or camera may as depicted in FIG. 4 may only be used in certain embodiments, while other embodiments may analyze video that was recorded in another manner (e.g., by a capture card) and/or which may not have included any physically automated experimentation by a robot arm or otherwise (e.g., a human may have started content playback on a computing device or otherwise made a selection via an application or service having its display output recorded without any robot usage).

Although not shown in FIG. 4, the camera-assisted robotic arm system 400 may include a computing device connected to one or more components shown in FIG. 4. The system 400 includes a mobile device mounting station 402 configured to physically hold a mobile device 404, a camera 406 configured to capture images of the mobile device 404, a robotic arm 408, a longitudinal rail 410, a latitudinal rail 412, and a vertical rail 414. The robotic arm 408 is configured to move along the rails 410, 412, and 414.

The mobile device mounting station 402 can physically hold the mobile device 404 in various different positions. For example, the mobile device mounting station 402 can hold the mobile device 402 such that the bottom left corner of the display screen of the mobile device 404 is aligned with a predefined reference point. The mobile device mounting station 402 may include an adjustment guide that can help a human operator mount the mobile device 404 in a designated position.

The mobile device 404 may include a touch-sensitive display screen. In some embodiments, the mobile device 404 is mounted in the mobile device mounting station 402 such that the touch-sensitive display screen of the mobile device 404 is facing the camera 406. The mobile device 404 may have a plurality of mobile applications installed thereon. In some embodiments, the performance of such mobile applications can be tested using the robotic arm 408.

While FIG. 4 depicts a mobile device such as a mobile phone or tablet computing device, and a mobile device is used as an example herein, it will be appreciated that the mounting station may be configured to hold a stand-alone display screen that is in communication with a computer (such as by being wired to a desktop computer, or communicating wirelessly with another computing device) that is not necessarily contained within the same housing as the screen. Accordingly, the camera-assisted robotic arm system illustrated in FIG. 4 is not limited to performing robotic actions with respect to a self-contained mobile device, but may be equally capable of performing robotic actions with respect to a screen that displays the output of another type of computing device (e.g., other than a mobile device), whether or not the entire computing system (e.g., the computing device and the associated display screen) is physically located within the mounting station. Similarly, a mounting station similar to that illustrated in FIG. 4 may be used to capture video of a variety of types of display screens that display the output of a computer, a mobile computing device, a television set top box, and/or other devices capable of providing visual output to a display screen.

The camera 406 can capture images of the mobile device 404 while the mobile device 404 is mounted in the mobile device mounting station 402. The camera 406 can be any set of image sensing components that can generate images depicting the mobile device 404 when the mobile device 404 is mounted in the mobile device mounting station 402. Although the camera 406 is used as an example capture device, any other image capture device can be used, such as a capture card that can capture images and/or videos directly from the mobile device 404 or from another device that can generate images and/or videos of the display screen of the mobile device 404. For example, a capture card may capture video via an HDMI, DVI, VGA, component or other input cable that is connected to the video output port of a computing device. In such embodiments, depending on the operating environment and the purpose of any experiments being performed, a camera and even a display may not be required in order to obtain video of a computing device's display output. Although the camera 406 is shown in FIG. 4 as being attached to the ceiling of the frame of the system 400, the camera 406 may be mounted in any other manner that allows the camera 406 to capture images of the mobile device 404.

The robotic arm 408 includes a tip that is capable of touching the display screen of the mobile device 404 when the robotic arm 408 is moved. The tip may be configured to activate a capacitive touchscreen (or any other type of touchscreen). In some cases, the phrase "robotic arm" as used in the present disclosure refers to the robotic arm 408. In other cases, the phrase as used in the present disclosure refers to the robotic arm 408 as well as the mechanism for moving the robotic arm 408, such as the rails 410, 412, and 414. Although the robotic arm 408 of FIG. 4 includes a rod mounted to the rails 410, 412, and 414 for moving the robotic arm 408, the robotic arm 408 can include any other mechanisms. For example, the robotic arm 408 may be a pad mounted above the mobile device 404 and having mechanical fingers configured to tap various portions of the display screen of the mobile device 404. As another example, the robotic arm 408 may be any mechanical arm with at least two or three degrees of freedom. As another example, the robotic arm 408 may be any touch-capable device that can touch some or all portions of the display screen of the mobile device 404. As another example, the robotic arm 408 may be any robot having its own movement system that can be mapped to the coordinate system corresponding to the display screen of the mobile device 404. In some cases, the phrase may refer to a non-robot that can perform the various tasks described herein as being performed by the robotic arm 408. For example, the robotic arm can be a gantry arm. In some embodiments, the robotic arm 408 is part of a cartesian robot, a gantry robot, a cylindrical robot, a spherical robot, an anthropomorphic robot, or the like.

The longitudinal rail 410 allows the robotic arm 408 to move in the longitudinal direction (e.g., towards and away from the mobile device 404). The latitudinal rail 412 allows the robotic arm 408 to move in the latitudinal direction (e.g., along a direction perpendicular to the longitudinal direction and parallel to the surface of the display screen of the mobile device 404 when the mobile device 404 is mounted in the mobile device mounting station 402). The vertical rail 414 allows the robotic arm 408 to move in the vertical direction (e.g., direction perpendicular to the surface of the display screen of the mobile device 404 when the mobile device 404 is mounted in the mobile device mounting station 402). Although the rails 410, 412, and 414 are shown in FIG. 4, any other mechanisms for moving the robotic arm 408 may be used instead. For example, different types of robotic arms may utilize different mechanisms for moving the robotic arm 408. Methods for calibrating the robotic arms and translating camera coordinates to a robotic arm coordinate system are described in co-owned U.S. patent application Ser. No. 15/648,284, titled "Automatic Detection of Screen Area and Camera Assisted Movement of Robotic Arm," which was filed on Jul. 12, 2017.

Figure 5:
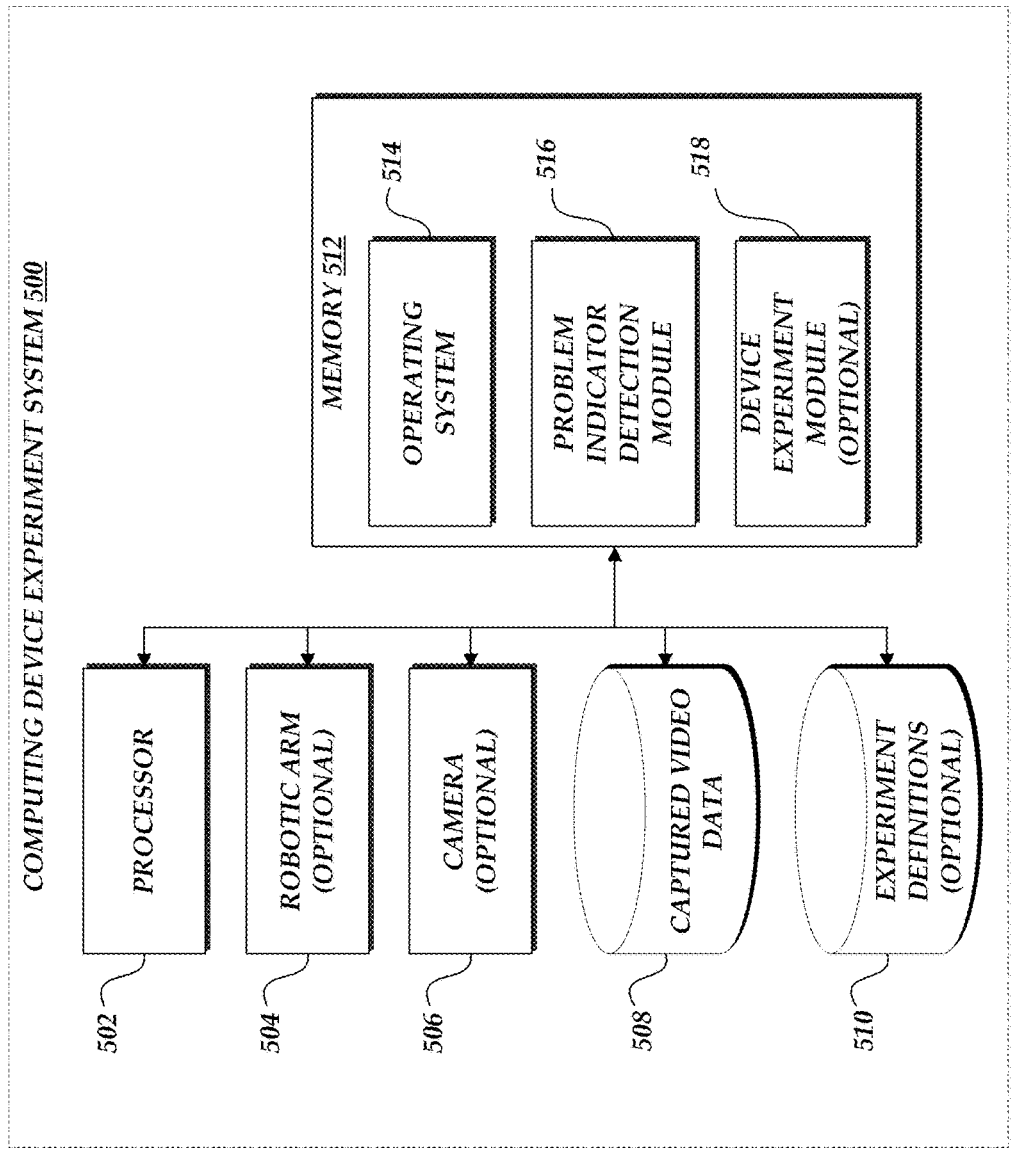
FIG. 5 is a block diagram illustrating components of a computing device experiment platform in accordance with aspects of the present disclosure.

FIG. 5 is a block diagram of an example computing device experiment system 500, which includes an arrangement of computer hardware and software components that may be used to implement aspects of the present disclosure. The computing device experiment system 500 may include many more (or fewer) elements than those shown in FIG. 5. It is not necessary, however, that all of these elements be shown in order to provide an enabling disclosure. While FIG. 5 is shown with reference to an embodiment in which a robotic arm and camera are used, it will be appreciated that many features of the system 500 may be optional depending on the embodiment. For example, aspects of the present disclosure provide benefits in analyzing pre-recorded video data even when implemented by systems without a robotic arm (e.g., without robotic arm 504), without recording video itself (e.g., without camera 506), and/or without the capability of performing experiments (e.g., without module 518 and data store 510).

As illustrated, the computing device experiment system 500 includes a processor 502, a robotic arm 504, an optional camera 506, a data store 508 for storing captured video data, and a data store 510 for storing experiment definitions, all of which may communicate with one another by way of a communication bus. Although not shown in FIG. 5, the computing device experiment system 500 may include a network interface for providing connectivity to one or more networks or computing systems and, as a result, enabling the computing device experiment system 500 to receive and send information and instructions from and to other computing systems or services. Although the computing device experiment system 500 includes both the data store 508 and the data store 510, in some embodiments, the computing device experiment system 500 may include a single data store that stores both captured video and experiment definitions.

The processor 502 may communicate to and from a memory 512. The memory 512 may contain computer program instructions (grouped as modules or components in some embodiments) that the processor 502 may execute in order to implement one or more embodiments of the present disclosure. The memory 512 generally includes RAM, ROM, and/or other persistent, auxiliary, or non-transitory computer-readable media. The memory 512 may store an operating system 514 that provides computer program instructions for use by the processor 502 in the general administration and operation of the computing device experiment system 500. The memory 512 may further store specific computer-executable instructions and other information (which may be referred to herein as "modules") for implementing aspects of the present disclosure. For example, the memory 512 may include a problem indicator detection module 516, which may perform various operations with regard to analyzing video data to detect problem indicators, as described herein. For example, the problem indicator detection module 516 may include computer-executable instructions and other information for performing the methods illustrated in FIGS. 2 and 3. The memory 512 may also include an optional device experiment module 518, which may be executed by the processor 502 to perform various operations in order to conduct one or more experiments with respect to a computing device for which the system 500 is analyzing the computing device's display output.

While the operating system 514, the problem indicator detection module 516, and the device experiment module 518 are illustrated as distinct modules in the memory 512, in some embodiments, the problem indicator detection module 516 and the device experiment module 518 may be incorporated as modules in the operating system 514 or another application or module, and as such, separate modules may not be required to implement some embodiments. In some embodiments, the problem indicator detection module 516 and the device experiment module 518 may be implemented as parts of a single application.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a", "an", or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others. All such modifications and variations are intended to be included herein within the scope of this disclosure and protected by the following claims.

What is claimed is:

1. A system comprising:

an electronic data store that stores a digital video, wherein the digital video comprises a plurality of frames, wherein the digital video comprises a recording of display output from a computing device; and a hardware processor in communication with the electronic data store, the hardware processor configured to execute computer-executable instructions to at least:

select a set of frames from the digital video;

for each of a plurality of frame pairings within the set of frames, determine a pixel change value for each of a plurality of pixel locations, wherein the pixel change value for each pixel location represents a mathematical difference between an intensity value at the pixel location in a first frame of the frame pairing and an intensity value at the pixel location in a second frame of the frame pairing;

determine adjusted pixel change values for each of the plurality of pixel locations, wherein the adjusted pixel change value for each individual pixel location comprises the lowest pixel change value determined within a window that includes the individual pixel location and one or more adjacent pixel locations;

determine, for each pixel location, a final pixel change value for the set of frames, wherein the final pixel change value for each individual pixel location comprises the highest adjusted pixel change value determined for the individual pixel location in any frame pairing within the set of frames;

generate a target motion score representing motion in a target area over the set of frames, wherein the target area is smaller than a size of each frame within the set of frames and has a fixed position across each of the set of frames, wherein the target motion score is based on the highest final pixel change value determined for any pixel location within the target area;

generate a peripheral motion score representing motion outside of the target area over the set of frames, wherein the peripheral motion score is based on the highest final pixel change value determined for any pixel location outside of the target area;

determine that isolated motion occurred within the target area over the set of frames based at least in part on a comparison of the target motion score to the peripheral motion score;

based at least in part on the final pixel change values of pixel locations within the target area, identify that a shape of the motion within the target area matches a target motion shape associated with a problem indicator; and store an indication that a problem indicator appeared in the digital video during at least a portion of the set of frames.

2. The system of claim 1, wherein the problem indicator is a buffering indicator that animates to have a spinning appearance, wherein the target motion shape is a circle.

3. The system of claim 2, wherein the hardware processor is configured to apply a circle Hough Transform with respect to final pixel change values determined for pixel locations within the target area, wherein the shape of the motion within the target area is determined to match the target motion shape based at least in part on results of the circle Hough Transform.

4. The system of claim 1, wherein the system further comprises a recording device comprising at least one of a camera or a capture card, wherein the recording device is configured to capture and store the display output from the computing device.

5. The system of claim 1, wherein the system further comprises:
a robotic arm having a tip configured to contact a touch-sensitive display screen of the computing device; and
wherein the hardware processor is further configured to cause the robotic arm to perform one or more movements that cause the tip of the robotic arm to touch at least one specific location on the touch-sensitive display screen in response to the hardware processor determining that the problem indicator appeared in the digital video.

6. A computer-implemented method comprising:
as implemented by one or more computing devices configured with specific executable instructions,
selecting a set of frames from a video, wherein the video comprises a plurality of frames depicting display output from a computing system;
for each of a plurality of frame pairings within the set of frames, determining a pixel change value for each of a plurality of pixel locations, wherein the pixel change value for each pixel location represents a mathematical difference between an intensity value at the pixel location in a first frame of the frame pairing and an intensity value at the pixel location in a second frame of the frame pairing;
determining adjusted pixel change values for each of the plurality of pixel locations, wherein the adjusted pixel change value for each individual pixel location is based at least in part on pixel change values of one or more other pixel locations that are adjacent to the individual pixel location;
determining, for each pixel location, a final pixel change value for the set of frames, wherein the final pixel change value for each individual pixel location is based at least in part on the highest adjusted pixel change value determined for the individual pixel location in any frame pairing within the set of frames;
based at least in part on the final pixel change values for the set of frames:
generating a target motion score representing motion in a target area over the set of frames, wherein the target area is a subset of pixel locations of each individual frame and is consistently located across the set of frames; and
generating a peripheral motion score representing motion outside of the target area over the set of frames;
determining that isolated motion occurred within the target area over the set of frames based at least in part on a comparison of the target motion score to the peripheral motion score;
identifying that a shape of the motion within the target area matches a target motion shape associated with a problem indicator; and
storing an indication that a problem indicator appeared in the video during at least a portion of the set of frames.

7. The computer-implemented method of claim 6, wherein at least a portion of the problem indicator follows a circular path of motion, and wherein the target motion shape is a circle.

8. The computer-implemented method of claim 6, wherein the problem indicator represents that the computing system is in a state associated with at least one of (a) buffering content from a network source or (b) loading content locally.

9. The computer-implemented method of claim 6, wherein the computing system having its display output depicted in the video is one of a mobile computing device, a desktop computer, or a set-top box.

10. The computer-implemented method of claim 6, wherein a bounding region defining the target area is selected from among a plurality of stored bounding regions that are each associated with a different application or service.

11. The computer-implemented method of claim 6, further comprising determining the target motion shape using a neural network that has been trained based on a plurality of videos known to include depiction of at least one problem indicator.

12. The computer-implemented method of claim 6, further comprising storing the final pixel change values in a matrix, wherein the matrix has dimensions that match or approximate dimensions by pixel count of a frame in the video.

13. The computer-implemented method of claim 6, further comprising, prior to determining the pixel change values, converting a color value of each pixel in the set of frames to be a gray scale value.

14. The computer-implemented method of claim 6, further comprising, prior to storing an indication that a problem indicator appeared, determining that there is less than a threshold amount of noise in the final pixel change values for pixel locations outside of the identified target motion shape.

15. A non-transitory physical computer storage medium storing computer-executable instructions that, when executed by one or more processors, configure the one or more processors to perform operations comprising:

selecting a set of frames from a video, wherein the video comprises a plurality of frames depicting display output from a computing system;

determining a pixel change value for each of a plurality of pixel locations, wherein the pixel change value for each pixel location represents an extent of pixel intensity change at the individual pixel location over at least two frames in the set of frames;

determining, based at least in part on pixel change values for a plurality of pixel locations, that motion occurred within a target area over the set of frames;

identifying that a shape of the motion within the target area matches a target motion shape associated with a problem indicator; and generating a signal indicating that a problem indicator appeared in the video during at least a portion of the set of frames.

16. The non-transitory physical computer storage medium of claim 15, wherein the target area is a center portion of each frame in the set of frames.

17. The non-transitory physical computer storage medium of claim 15, wherein the signal causes a responsive action to be performed with respect to the computing system.

18. The non-transitory physical computer storage medium of claim 17, wherein the responsive action comprises one of: stopping an experiment being performed in association with the computing system, or presenting a notification that a problem has occurred with respect to the computing system.

19. The non-transitory physical computer storage medium of claim 15, wherein the problem indicator is a buffering indicator indicating that content playback by the computing system has been interrupted or paused as a result of network conditions.

20. The non-transitory physical computer storage medium of claim 15, wherein the operations further comprise, prior to determining that motion occurred within the target area:

applying noise reduction to the pixel change values, wherein applying the noise reduction includes modifying a pixel change value of at least one pixel location based on pixel change values of one or more neighboring pixel locations.

\* \* \* \* \*